Sept. 28, 1965 H. F. DUNLAP ETAL 3,208,209
ROTARY SAFETY BLADE
Filed May 1, 1963 2 Sheets-Sheet 1
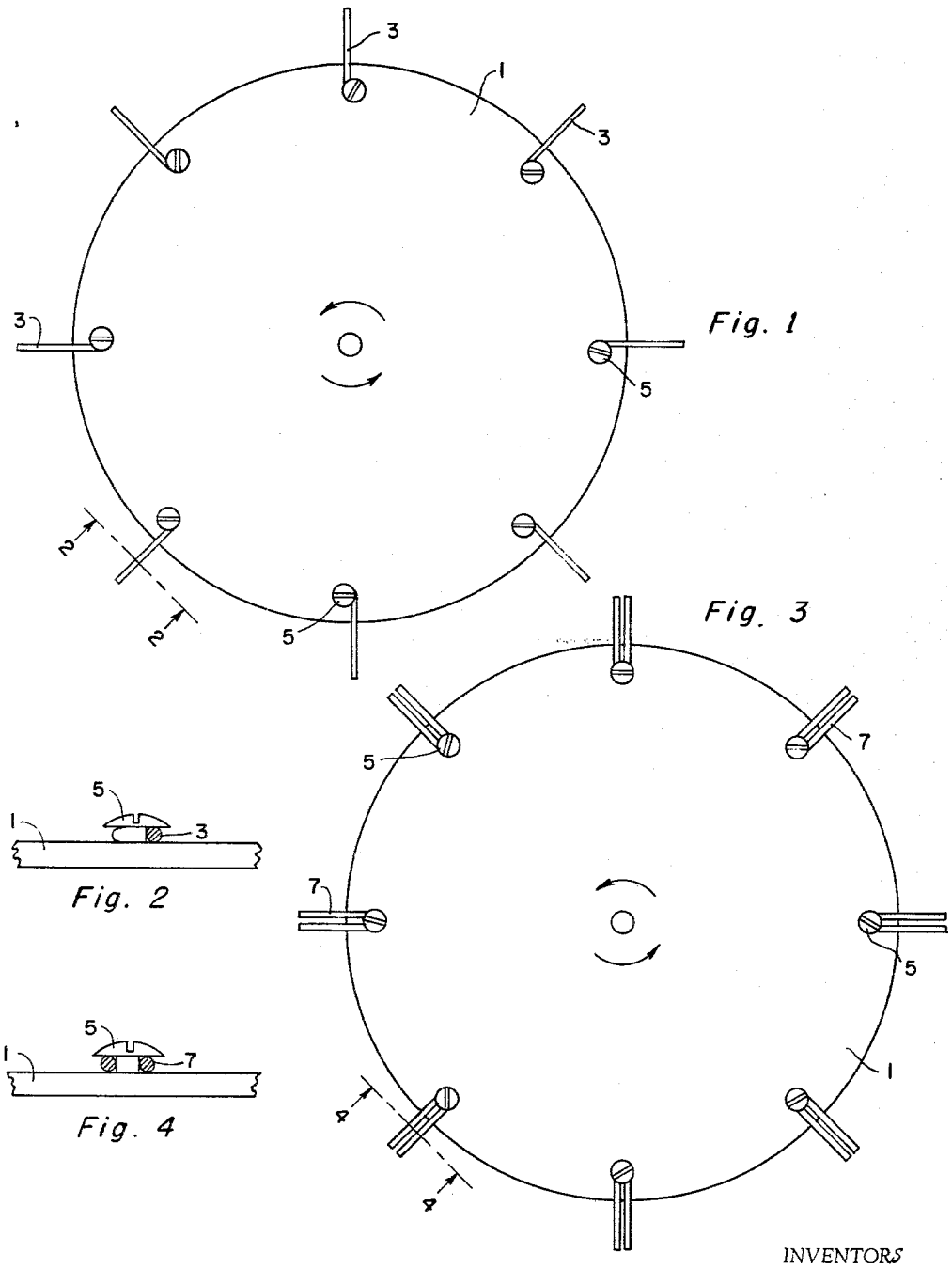
INVENTORS
Henry F. Dunlap
Alpheus A. Franklin
BY
Charles F. Steininger
Attorney Sept. 28, 1965    H. F. DUNLAP ETAL    3,208,209
ROTARY SAFETY BLADE Filed May 1, 1963    2 Sheets-Sheet 2

INVENTORS
Henry F. Dunlap
Alpheus A. Franklin
BY Charles F. Steininger
Attorney

United States Patent Office 3,208,209
Patented Sept. 28, 1965

3,208,209
ROTARY SAFETY BLADE
Henry F. Dunlap and Alpheus A. Franklin, Dallas, Tex., assignors to The Atlantic Refining Company, Philadelphia, Pa., a corporation of Pennsylvania
Filed May 1, 1963, Ser. No. 277,185
2 Claims. (Cl. 56—295)

The present invention relates to mowing machines. More particularly, the present invention relates to improved cutters for rotary mowing machines of the type utilizing a cutter rotating in a horizontal plane about a vertical shaft.

Mowing machines of the rotary type conventionally utilize a flat, substantially rectangular blade with the leading edges of the blade sharpened and the blade rotating about a vertically-disposed shaft. In this type of mower, the subject blade rotate at an extremely high speed and the combination of this high speed plus the sharpening of the leading edges of the blade results in the efficient cutting of grass. However, such mowers have been found to be extremely dangerous, both to the operator and to bystanders, due to the fact that foreign objects lying in the grass are struck by the blade and quite often are thrown outwardly with sufficient force and speed to cause serious injuries.

It is, therefore, an object of the present invention to provide a novel and improved cutter for rotary mowers having a high degree of safety.

A more specific object of the present invention is to provide a novel and improved disc-type cutter for rotary mowers having a substantially increased degree of safety.

These and other objects of the present invention will be more apparent from the following detailed description when read in conjunction with the accompanying drawings, wherein:

FIGURE 1 shows a plane view of the bottom of one form of cutter made in accordance with the present invention;

FIGURE 2 is a side view, partially in section, of the cutter of FIGURE 1 taken along the line 2—2;

FIGURE 3 is a plane view of the bottom of a cutter made in accordance with the present invention and illustrating a variation in the cutting elements;

FIGURE 4 is a side view, partially in section, of the cutter of FIGURE 3 taken along the line 4—4;

Figure 6:
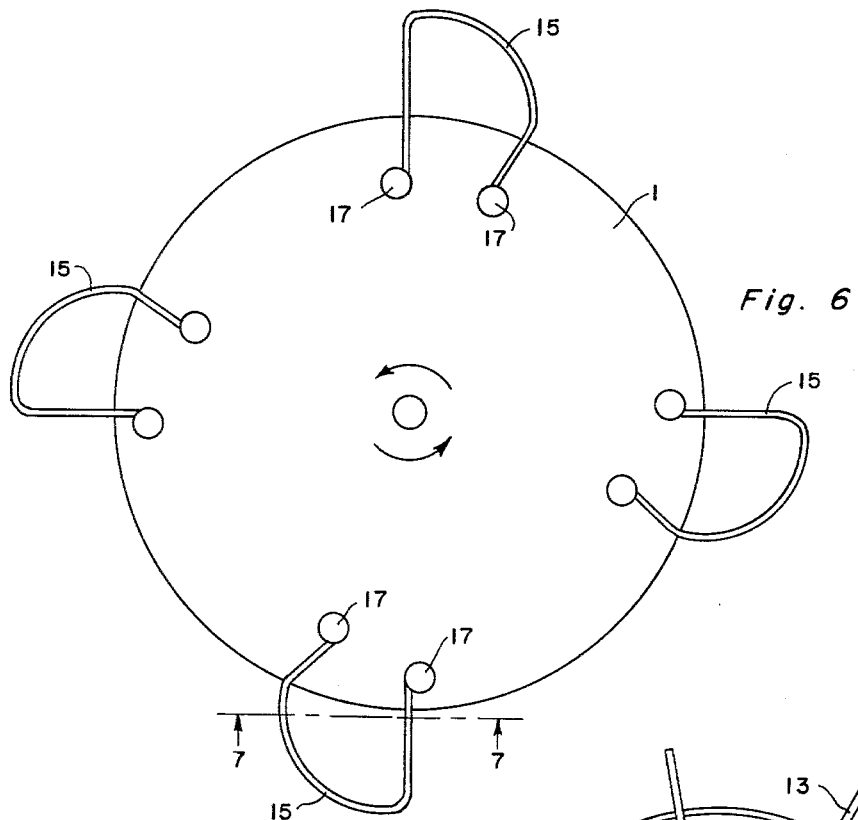
FIGURE 6 is a plane view of the bottom of a cutter made in accordance with the present invention and illustrating still another variation of the cutting elements.

Referring specifically to FIGURES 1 and 2 of the drawings, the body portion of the improved cutter of the present invention comprises a substantially flat disc member 1. Attached to disc member 1 and radiating from the rim portion thereof are a plurality of yieldable, wire cutting elements 3. Wire cutting elements 3 are made of any suitable material having sufficient resilience that they will bend when a foreign object is struck and, after having passed the object, spring back to their original straight configuration. Cutting elements 3 should also have sufficient rigidity that they will not be bent by the normal pressure exerted against them by the grass being cut. The length of cutting elements 3 has been exaggerated for illustrative purposes. It has been established that only a very short portion of the tip of a rotating cutting element is responsible for the cutting of the grass. Accordingly, cutting elements 3 should not project more than about two inches beyond the rim or periphery of disc 1. This limited projection permits the use of thin wires which have a high cutting efficiency while at the same time being sufficiently rigid to cut the grass without being bent. The utilization of wire cutting elements 3, together with the smooth, circular or unbroken peripheral form of disc 1, make it virtually impossible for the cutter to throw foreign objects outwardly with sufficient force to cause injury. The cutting elements 3 will yield when they strike a foreign object and if a foreign object should strike the periphery of disc 1, the disc will simply spin the object in place, without projecting it, or roll over the object. Cutting elements 3 are attached to disc 1 by means of bolts 5 which pass through a loop formed in the ends of cutting elements 3. Cutting elements 3 may be rigidly attached to disc 1 by means of bolts 5 so that the cutting elements 3 will not rotate on their mounting element when an object is struck. Cutting elements 3 should, however, be removable for replacement purposes. Cutting elements 3 may also be frictionally held on disc 1 in a manner such that the cutting elements will not rotate on their mounting element under normal cutting conditions but will rotate when a foreign object is struck. In this instance, cutting elements 3 may be constructed of a less flexible material.

FIGURES 3 and 4 illustrate a cutter having a disc 1 and a modified form of cutting element. In this particular instance, cutting elements 7 consist of conventional wire hairpins which are removable attached to disc 1 by bolts 5 passing through the U-shaped end of the hairpin.

Figure 5:
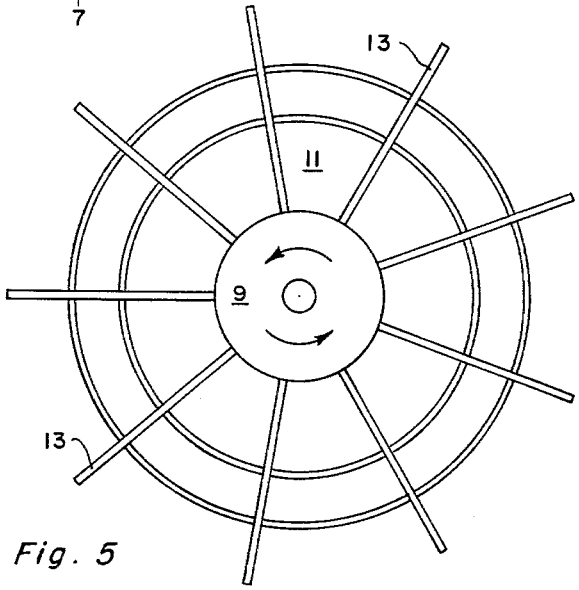
FIGURE 5 is a plane view of the bottom of a cutter made in accordance with the present invention and illustrating a variation in the construction of the body portion of the cutter.

FIGURE 5 of the drawings illustrates a modified version of the cutter of the present invention. In this particular instance, the cutter comprises a hub portion 9 and a grill portion 11, attached to hub portion 9 by welding or other suitable techniques. Extending radially from the periphery of grill portion 11 are wire cutting elements 13. Wire cutting elements 13 may, as shown in FIGURE 5, be extensions of radially-disposed bars of the grill portion 11 or they may be separate and distinct wire-type cutters suitably attached to the periphery of grill portion 11. This particular construction of the body portion of the cutters of the present invention has several advantages over a solid disc-type body. A considerable reduction in the weight of the cutter can be effected and the frictional drag of the cutter over the cut grass can be reduced by this particular construction. It should be noted, however, that the body portion of the cutter should present a substantially continuous, unbroken periphery so that objects which pass between the cutting elements 13 will be struck a glancing blow by the circular periphery of the body portion. The body portion of the cutter of the present invention may take other forms adapted to reduce frictional drag and reduce the weight thereof. For example, the body portion may be made up of an annular ring joined to the hub portion by a plurality of support spokes or the central portion of the body may be raised above the peripheral portion to reduce frictional drag.

Figure 7:
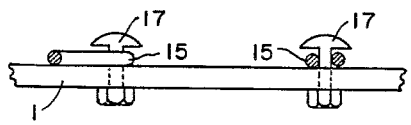
FIGURE 7 is a side view, partially in section, taken along the line 7—7 of FIGURE 6.

FIGURES 6 and 7 of the drawings illustrate still another variation of the cutter of the present invention. In this embodiment, the cutter has a body portion 1 in the form of a flat disc which is adapted for attachment to the rotatable shaft of the mower. Mounted on the periphery of disc 1 are loop-type wire cutting elements 15. The terminal ends of loops 15 are formed as small open loops which are hooked on bolt-type mounting elements 17. Mounting elements 17 are spaced from one another in a manner such that loops 15 are held in tension by mounting elements 17. Thus, loops 15 will be resilient and thus bend when a foreign object is struck and, in addition, will have a certain degree of freedom to rotate on mounting elements 17. Accordingly, cutting elements 15 are highly effective in reducing the tendency of the cutter to throw foreign objects outwardly and can be constructed of sufficiently thin wire to be efficient cutters. The forward portion of cutting elements 15, which are the leading edges when considered with respect to the direction of rotation of the cutter, should preferably be straight and parallel to the radii of the cutter. This particular configuration also improves the cutting efficiency of cutting elements 15.

It will be obvious from the prior description that other modifications and variations of the present invention will occur to those skilled in the art. Accordingly, the present invention is limited only in accordance with the claims which follow.

We claim:
1. An improved cutter for a rotary mower adapted to rotate in a substantially horizontal plane about a vertically-disposed shaft and to cut grass comprising a circular body adapted for attachment to said shaft and having a smooth, generally circular rim, and a plurality of wire cutting elements radiating from said rim, said wire cutting elements being loops of wire having two ends and having a straight leading portion with respect to the direction of rotation of the cutter, said leading portion being parallel to the radii of said cutter, said ends of said loops being mounted on said disc by way of mounting posts, said mounting posts being positioned and adapted to hold the wire of said loops in tension and to allow said ends of said loops to rotate on said mounting posts.

2. An improved cutter in accordance with claim 1 wherein the wire cutting elements radiate from the rim by a distance of less than two inches.

References Cited by the Examiner
UNITED STATES PATENTS

| | | | |
|---|---|---|---|
| 2,557,598 | 6/51 | Daggett | 56—295 X |
| 2,663,137 | 12/53 | Asbury | 56—295 |
| 2,707,859 | 5/55 | Walker | 56—295 |
| 3,014,333 | 12/61 | Clark | 56—295 |
| 3,018,602 | 1/62 | Diesterweg | 56—295 |
| 3,068,633 | 12/62 | Taylor | 56—295 |

FOREIGN PATENTS

| | | |
|---|---|---|
| 774,540 | 5/57 | Great Britain. |
| 283,332 | 9/52 | Switzerland. |

ANTONIO F. GUIDA, *Acting Primary Examiner.*
RUSSELL R. KINSEY, T. GRAHAM CRAVER,
*Examiners.*